US010263560B2

(12) United States Patent
Kitano et al.

(10) Patent No.: US 10,263,560 B2
(45) Date of Patent: Apr. 16, 2019

(54) MOTOR DRIVE CONTROLLER AND MOTOR DRIVE CONTROL METHOD

(71) Applicant: MINEBEA MITSUMI Inc., Kitasaku-gun, Nagano (JP)

(72) Inventors: Takamichi Kitano, Kakegawa (JP); Katsunori Yamamoto, Iwata (JP)

(73) Assignee: MINEBEA MITSUMI INC., Kitasaku-gun (JP)

( * ) Notice: Subject to any disclaimer, the term of this patent is extended or adjusted under 35 U.S.C. 154(b) by 23 days.

(21) Appl. No.: 15/589,054

(22) Filed: May 8, 2017

(65) Prior Publication Data

US 2017/0331411 A1 Nov. 16, 2017

(30) Foreign Application Priority Data

May 13, 2016 (JP) ................. 2016-097441

(51) Int. Cl.
*H02P 6/06* (2006.01)
*H02P 6/17* (2016.01)
*H02P 29/024* (2016.01)

(52) U.S. Cl.
CPC .............. *H02P 29/024* (2013.01); *H02P 6/06* (2013.01); *H02P 6/17* (2016.02)

(58) Field of Classification Search
CPC .................................................... H02P 29/024
USPC ................................................ 318/465, 461
See application file for complete search history.

(56) References Cited

U.S. PATENT DOCUMENTS

| 8,324,845 B2 * | 12/2012 | Suzuki | ...................... B25F 5/00 |
| | | | 318/139 |
| 8,890,449 B2 * | 11/2014 | Suzuki | ...................... B25F 5/00 |
| | | | 173/15 |
| 9,473,055 B2 * | 10/2016 | Ito | ........................... H02P 7/285 |

FOREIGN PATENT DOCUMENTS

| JP | 2013-021866 A | 1/2013 |
| JP | 2014-087511 A | 5/2014 |

OTHER PUBLICATIONS

Nov. 6, 2018 Office Action issued in Japanese Patent Application No. 2016-097441.

* cited by examiner

*Primary Examiner* — David Luo
(74) *Attorney, Agent, or Firm* — Oliff PLC

(57) ABSTRACT

A motor drive controller according to one aspect of the present disclosure including a monitoring unit monitoring a motor and detecting that the motor is in a driving state but is also in a predetermined abnormal state; and a incomplete lock determination unit executing a determination program at a point of time when the abnormal state is detected and causing the determination program to determine whether or not the motor is in an incomplete locked state in which a load not sufficient to stop the motor is applied to a rotating body rotated by driving of the motor.

20 Claims, 3 Drawing Sheets

MOTOR DRIVE CONTROLLER AND MOTOR DRIVE CONTROL METHOD

CROSS REFERENCE TO RELATED APPLICATIONS

This application claims the benefit of Japanese Patent Application No. 2016-097441, filed May 13, 2016 which is hereby incorporated by reference in its entirety.

BACKGROUND

Technical Field

The present disclosure relates to a motor drive controller and a motor drive control method.

Background Art

There has been disclosed a conventional motor drive controller which stops operation of a final product used in a motor for use in a fan device or the like if such a motor is determined to be in a locked state (see JP Unexamined Patent Application Publication No. 2013-21866). More specifically, the motor drive controller detects whether or not the motor is in a locked state, that is, in a state in which the motor is completely locked and its rotation stops.

However, the conventional motor drive controller cannot determine that the motor is in an abnormal state if a load applied to a rotating body such as a fan is not sufficient to stop rotation of the motor and the load causes the motor to be in an unstable rotating state (hereinafter referred to as an incomplete locked state).

The present disclosure is related to providing a motor drive controller and a motor drive control method capable of reliably detecting that the motor is in an incomplete locked state.

SUMMARY

A motor drive controller according to one aspect of the present disclosure comprises: a monitoring unit monitoring a motor and detecting that the motor is in a driving state but in a predetermined abnormal state; and a determination unit of incomplete locked state executing a determination program at a point of time when the abnormal state is detected and causing the determination program to determine whether or not the motor is in an incomplete locked state in which a load not sufficient to stop the motor is applied to a rotating body rotated by the driving of the motor.

This aspect of the present disclosure can reliably detect that the motor is in an incomplete locked state.

DETAILED DESCRIPTION

Hereinafter, a motor drive controller and a motor drive control method according to an embodiment will be described with reference to the accompanying drawings. It should be noted that the present disclosure is not limited to the following embodiments.

Embodiments

Figure 1:
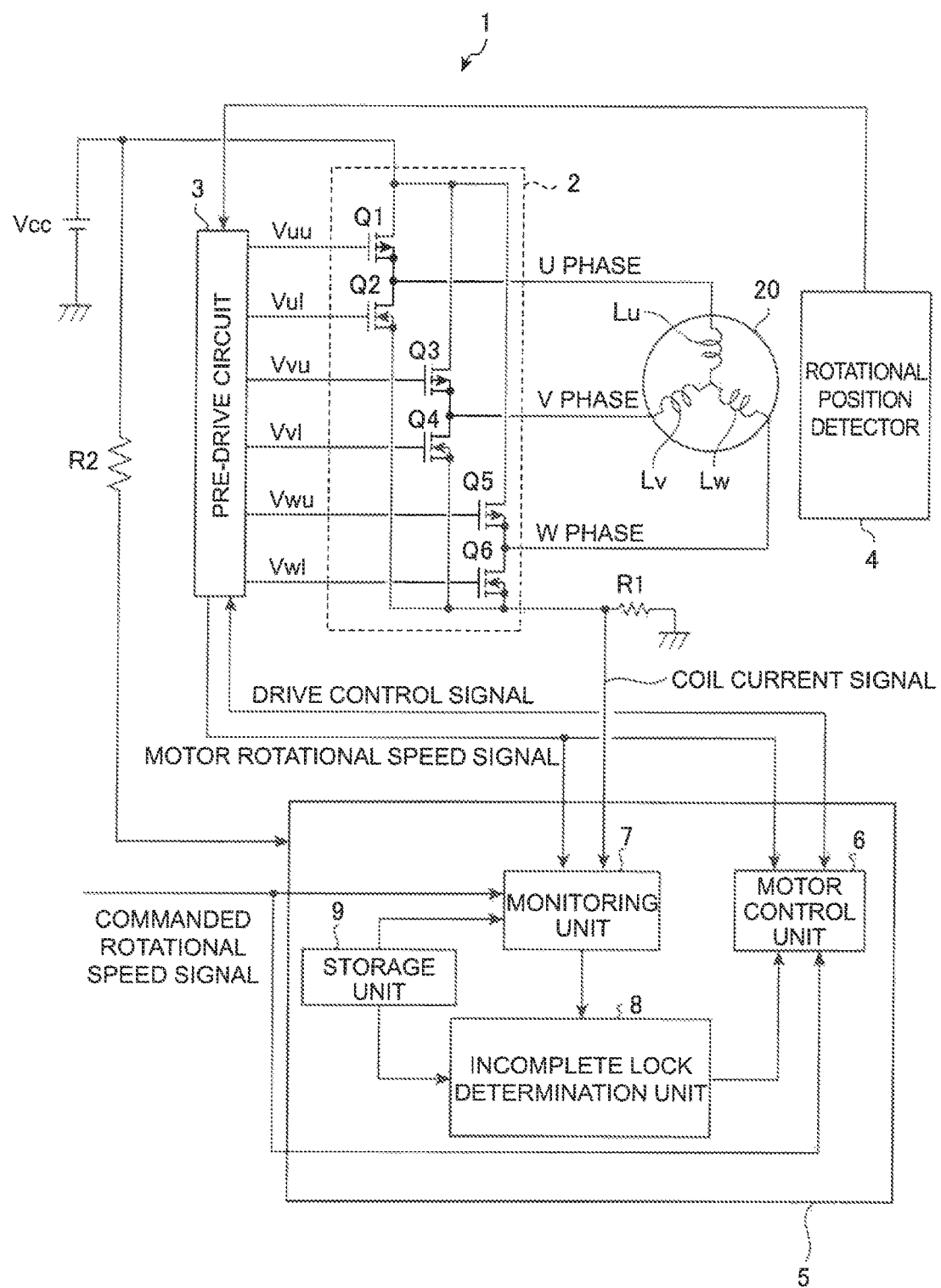
FIG. 1 is a block diagram illustrating a circuit configuration of a motor drive controller according to an embodiment.

FIG. 1 is a block diagram illustrating a circuit configuration of a motor drive controller according to an embodiment.

As illustrated in FIG. 1, a motor drive controller 1 according to the embodiment includes a monitoring unit 7 and an incomplete lock determination unit 8. The monitoring unit 7 monitors a motor 20 to detect that the motor 20 is not in a driving state but is also in a predetermined abnormal state. In addition, the incomplete lock determination unit 8 executes a determination program at a point of time when such an abnormal state is detected, and causes the determination program to determine whether or not the motor 20 is in an incomplete locked state in which a load not sufficient to stop the motor 20 is applied to a rotating body rotated by driving of the motor 20.

For example, when lint and the like is entangled with the fan, this incomplete locked state occurs, causing a slow rotation or an unstable rotation of the motor. If the motor is in an incomplete locked state, the conventional motor drive controller continues to instruct the motor to increase the rotational speed up to a commanded rotational speed. Thus, the coil temperature of the motor increases and the motor may overheat.

Here, the motor drive controller 1 according to the embodiment can use the above described configuration to reliably detect that the motor 20 is in an incomplete locked state and prevent the motor 20 from continuing to operate while in the incomplete locked state.

Hereinafter, the description will focus on the details of the motor drive controller 1 according to the embodiment. The motor drive controller 1 is configured, for example, to drive the motor 20 with a sinusoidal wave. In the embodiment, the motor 20 is, for example, a 3-phase brushless motor such as a fan motor for rotating an unillustrated rotating body such as a fan. The motor drive controller 1 rotates the motor 20 by applying a sinusoidal drive current to armature coils Lu, Lv, and Lw of the motor 20 based on a rotational position signal of a rotor outputted from a rotational position detector 4.

The motor drive controller 1 comprises an inverter circuit 2, a pre-drive circuit 3, and a control circuit unit 5. Note that the components of the motor drive controller 1 illustrated in FIG. 1 are part of the whole, and the motor drive controller 1 may include not only the components illustrated in FIG. 1 but also other components.

The motor drive controller 1 is an integrated circuit (IC) device, the whole of which is packaged. Note that some of the motor drive controllers 1 may be packaged as one integrated circuit device, or all or some of the motor drive controllers 1 may be packaged as one integrated circuit device together with other devices.

In response to an output signal outputted from the pre-drive circuit 3, the inverter circuit 2 outputs drive signals to the motor 20 to supply power to armature coils Lu, Lv, and Lw of the motor 20. The inverter circuit 2 is configured such that pairs of series circuits of two switching elements (a pair of switching elements Q1 and Q2, a pair of switching elements Q3 and Q4, and a pair of switching elements Q5 and Q6) provided at both ends of a DC power source Vcc are disposed as coils Lu, Lv, and Lw corresponding to respective phases (U phase, V phase, and W phase). In each pair of two switching elements, a connection point between the two switching elements serves as an output end thereof and the output end is connected to a terminal leading to coils Lu, Lv, and Lw of respective phases of the motor 20. More specifically, the connection point between the switching elements Q1 and Q2 serves as the output end leading to the terminal of the U phase coil Lu. In addition, the connection point between the switching elements Q3 and Q4 serves as the output end leading to the terminal of the V phase coil Lv. In addition, the connection point between the switching elements Q5 and Q6 serves as the output end leading to the terminal of the W phase coil Lw.

Based on control by the control circuit unit 5, the pre-drive circuit 3 generates output signals for driving the inverter circuit 2 and outputs the signals to the inverter circuit 2. Examples of the output signals to be generated include Vuu, Vul, Vvu, Vvl, Vwu, and Vwl corresponding to the respective switching elements Q1 to Q6 of the inverter circuit 2. More specifically, an output signal Vuu is outputted to the switching element Q1 and an output signal Vul is outputted to the switching element Q2. In addition, an output signal Vvu is outputted to the switching element Q3, and an output signal Vvl is outputted to the switching element Q4. Further, an output signal Vwu is outputted to the switching element Q5, and an output signal Vwl is outputted to the switching element Q6. In response to these output signals, the switching elements Q1 to Q6 corresponding to the respective output signals are turned on or off. When turned on, a drive signal is outputted to the motor 20 and power is supplied to the respective phase coils of the motor 20. To stop rotation of the motor 20, all the switching elements Q1 to Q6 are turned off.

In the present embodiment, a rotational speed signal is inputted to the control circuit unit 5. More specifically, the rotational speed signal is inputted to the control circuit unit 5 from the rotational position detector 4 installed in the motor 20 via the pre-drive circuit 3. Examples of the rotational speed signal include an FG signal corresponding to rotation of a rotor of the motor 20. In other words, the rotational speed signal refers to rotational speed information indicating a detection result of the rotational speed of the motor 20. The FG signal may be a signal (pattern FG) generated using a coil pattern provided in a substrate on the rotor side, or may be a signal (Hall FG) generated using an output of a Hall element disposed in the motor 20. Alternatively, a rotational position detection circuit may be provided to detect a counter electromotive voltage induced in phases (U, V, and W phases) of the motor 20, and based on the detected counter electromotive voltage, the rotational position and the rotational speed of the rotor of the motor 20 may be detected. Still alternatively, a sensor signal of an encoder may be used to detect the rotational speed of the motor and rotational position thereof.

The control circuit unit 5 comprises a motor control unit 6, a monitoring unit 7, an incomplete lock determination unit 8, and a storage unit 9. The control circuit unit 5 includes, for example, a microcomputer, a digital circuit, and the like. The drive power is supplied to the control circuit unit 5, for example, by stepping down direct current power source Vcc by means of a resistor R2.

Based on a rotational speed command signal (a clock signal having a frequency corresponding to a target rotational speed) to be set by the user via an external terminal and the like and a motor rotational speed signal, the motor control unit 6 generates a drive control signal and outputs the generated drive control signal to the pre-drive circuit 3. More specifically, the motor control unit 6 controls rotation of the motor 20 by outputting the drive control signal for driving the motor 20 to the pre-drive circuit 3 while controlling feedback by comparing the target rotational speed and an actual rotational speed of the motor 20. In response to the drive control signal, the pre-drive circuit 3 generates an output signal for driving the inverter circuit 2 and outputs the generated signal to the inverter circuit 2.

The monitoring unit 7 receives a rotational speed command signal via an external terminal or the like and acquires information on a commanded rotational speed of the motor 20 instructed by the user. In addition, the monitoring unit 7 receives a motor rotational speed signal from the pre-drive circuit 3 and acquires information on a motor rotational speed fed back from the motor 20. Further, the monitoring unit 7 receives a coil current signal containing information on a coil current value to be outputted to a ground side from a coil of each phase of the motor 20 and acquires information on the coil current value fed back from the motor 20. Note that in the present embodiment, the coil current value is converted to a voltage value by a resistor R1; then, the monitoring unit 7 receives the information on the voltage value as coil current information and converts the information to the coil current value again.

Note that in FIG. 1, the rotational speed command signal is inputted to the motor control unit 6 and the monitoring unit 7 from outside, but may be inputted to the motor control unit 6 and the monitoring unit 7 from inside.

Then, the monitoring unit 7 detects that the motor 20 is in a predetermined abnormal state based on a difference between the acquired commanded rotational speed and the motor rotational speed as well as a difference between a predetermined current threshold and the coil current value. More specifically, if the ratio of the motor rotational speed to the commanded rotational speed is equal to or less than a predetermined threshold ratio, the monitoring unit 7 detects that the motor 20 is in an abnormal state. In addition, if a frequency at which the coil current value exceeds the current threshold reaches a predetermined threshold frequency, the monitoring unit 7 detects that the motor 20 is in an abnormal state. Then, the monitoring unit 7 monitors whether or not the motor 20 is in an abnormal state at a predetermined interval. Note that the predetermined interval for monitoring whether or not the motor 20 is in an abnormal state may be arbitrarily set.

Then, the monitoring unit 7 transmits information on the commanded rotational speed, the motor rotational speed, and the coil current value as well as the detection result as to whether or not the motor 20 is in an abnormal state, to the incomplete lock determination unit 8 for each monitoring.

At a point of time when the monitoring unit 7 detects the abnormal state, the incomplete lock determination unit 8 executes a determination program and causes the determination program to determine whether or not the motor 20 is in an incomplete locked state in which a load not sufficient to stop the motor 20 is applied to a rotating body rotated by driving of the motor 20. In addition, the incomplete lock determination unit 8 uses the determination program to determine whether or not the motor 20 is in an incomplete locked state based on the frequency of detecting the abnormal state. If it is determined that the motor 20 is in an incomplete locked state, the incomplete lock determination unit 8 instructs the motor control unit 6 to perform protection operation on the motor 20. Note that the determination program executed by the incomplete lock determination unit 8 will be described in detail later.

The storage unit 9 preliminarily stores various settings for controlling various processes in the monitoring unit 7 and the incomplete lock determination unit 8. The storage unit 9 is a non-volatile memory such as an electrically erasable programmable read-only memory (EEPROM).

Figure 2:
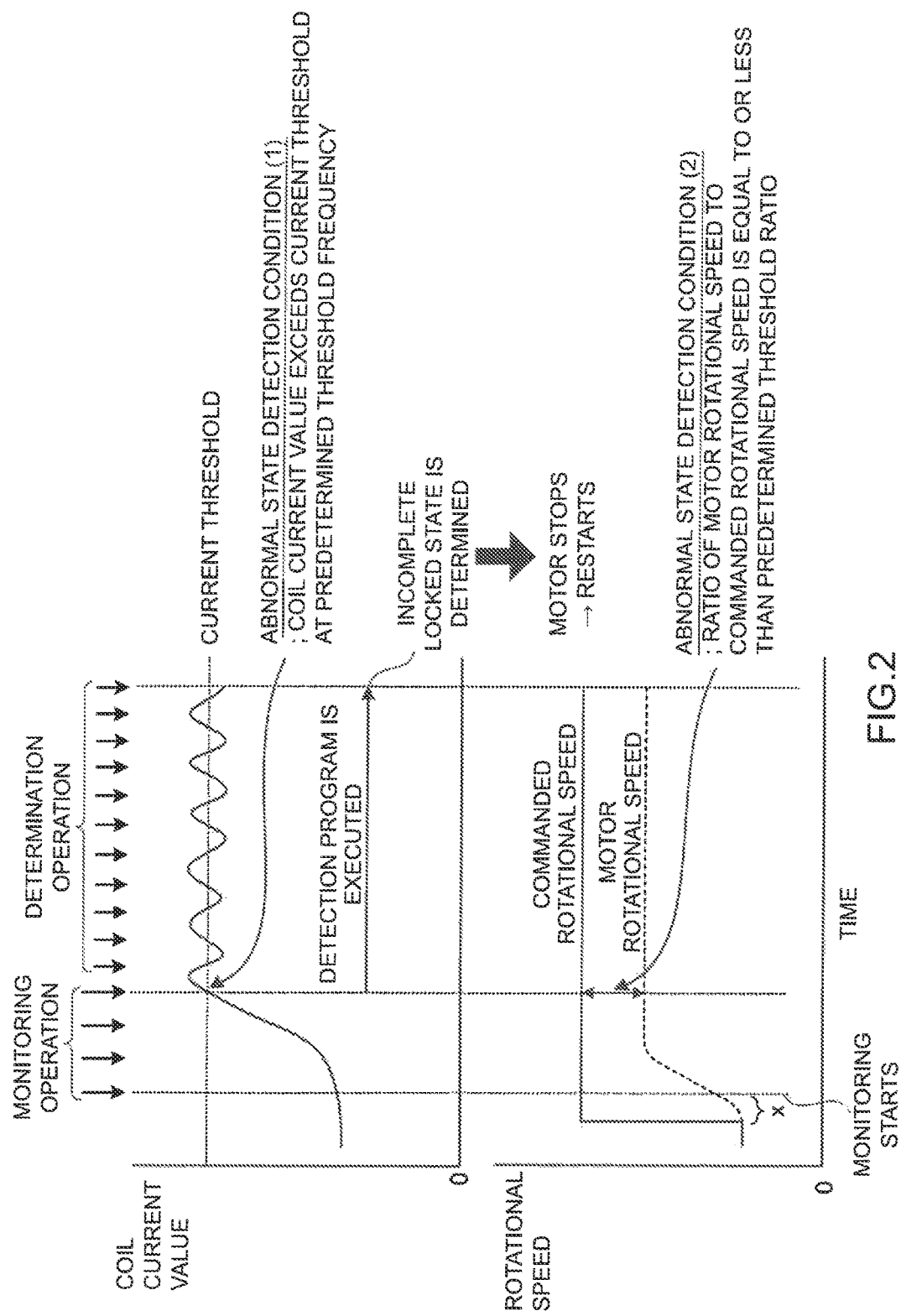
FIG. 2 is a timing chart illustrating an example of operation of the motor drive controller according to the embodiment.

Then, with reference to FIG. 2, the description will focus on an example of monitoring operation and determination operation of the motor drive controller 1 according to the embodiment.

FIG. 2 is a timing chart illustrating an example of operation of the motor drive controller 1 according to the embodiment. In FIG. 2, the upper portion illustrates a transition of the coil current value, and the lower portion illustrates a transition of the commanded rotational speed and the motor rotational speed.

The monitoring unit 7 (see FIG. 1) starts the monitoring operation when the motor 20 is activated or when a predetermined time has elapsed since the commanded rotational speed was changed. In FIG. 2, the monitoring operation starts when a time period of x has elapsed since the commanded rotational speed was changed. Then, the monitoring unit 7 executes the monitoring operation at every predetermined interval illustrated in the upper portion in FIG. 2. Note that the predetermined interval for executing the monitoring operation may be arbitrarily set.

Thus, the monitoring unit 7 detects that motor 20 is in a predetermined abnormal state based on the difference between the commanded rotational speed and the motor rotational speed as well as the difference between the predetermined current threshold and the coil current value. In FIG. 2, if the two conditions are both established, the abnormal state is detected. The first condition refers to a case in which the coil current value exceeds the predetermined current threshold at a predetermined threshold frequency (a threshold frequency is 1 in FIG. 2). The second condition refers to a case in which the ratio of the motor rotational speed to the commanded rotational speed is equal to or less than a predetermined threshold ratio.

If it is detected that the motor 20 is in the predetermined abnormal state, the monitoring unit 7 informs the incomplete lock determination unit 8 (see FIG. 1) that the motor 20 is in an abnormal state, and then the incomplete lock determination unit 8 executes the determination program.

As illustrated in the upper portion of FIG. 2, the determination program executes the determination operation at a predetermined interval in the same manner as the monitoring operation. The monitoring operation and the determination operation may be performed at the same interval or may be performed at different intervals. FIG. 2 illustrates an example of performing the determination operation at a shorter interval than that of the monitoring operation. The present embodiment can determine whether or not the detected abnormal state is caused by the incomplete locked state at a shorter time and in a more accurate manner by performing the determination operation at a shorter interval than that of the monitoring operation.

If the determination program to be described later determines that the motor 20 is in an incomplete locked state, the incomplete lock determination unit 8 instructs the motor control unit 6 (see FIG. 1) to perform a protection operation on the motor 20. Then, the motor control unit 6 instructs the pre-drive circuit 3 (see FIG. 1) to perform a protection operation such as temporarily stopping the motor and restarting the motor when a predetermined time has elapsed. Note that the protection operation of the present embodiment is not limited to the above operation, but may be appropriately set such as only stopping or repeating the operations of stopping and restarting.

Note that FIG. 2 illustrates a phenomenon such that the coil current value rises and then swings up and down in the vicinity of the current threshold value. Such a phenomenon occurs because the present embodiment uses an overcurrent threshold as the current threshold and causes the motor drive controller 1 to perform an existing overcurrent protection to control the coil current value so as not to exceed the overcurrent threshold. Note also that a value other than the overcurrent threshold may be used as the current threshold of the present embodiment.

Figure 3:
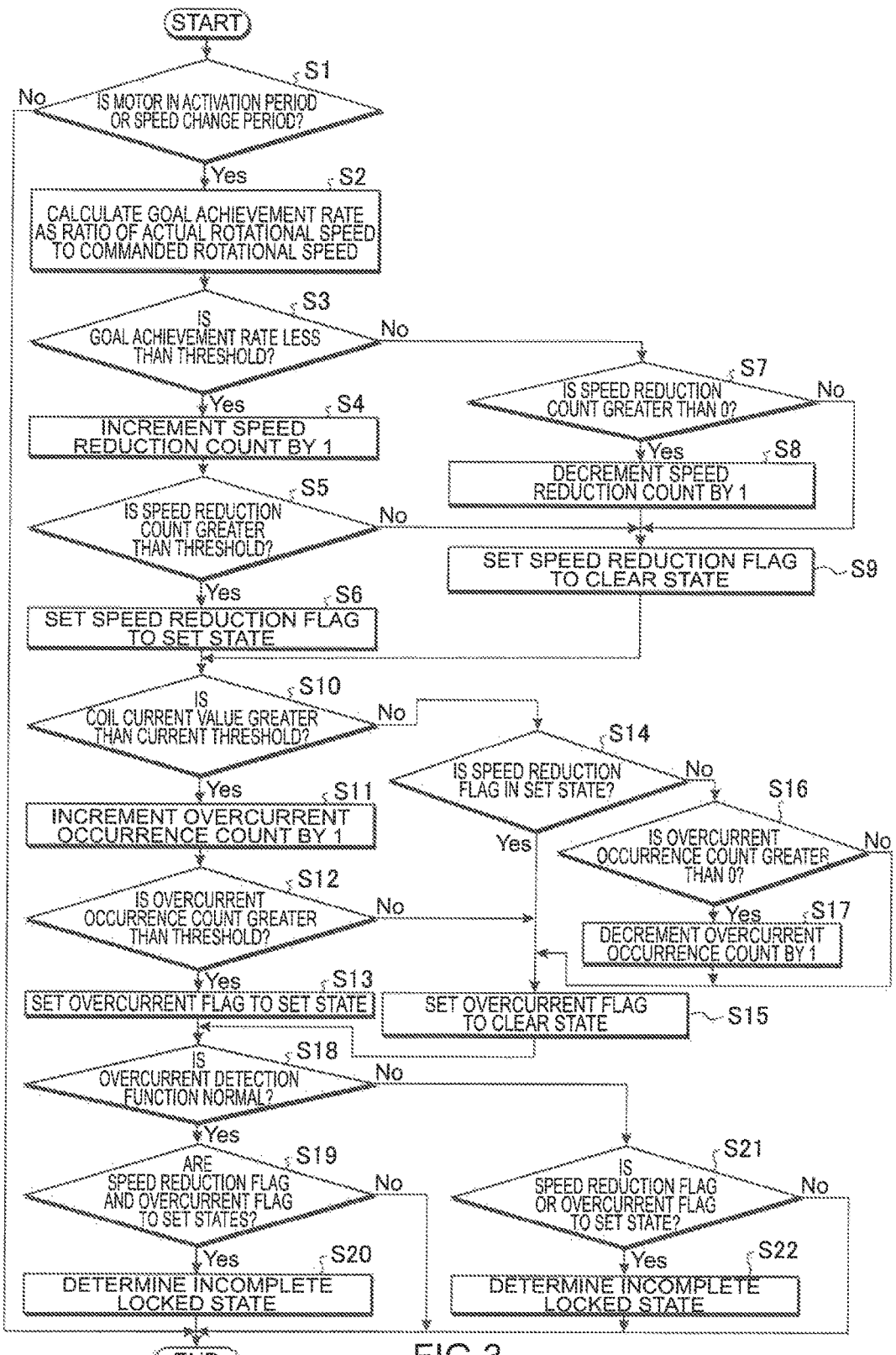
FIG. 3 is a flowchart illustrating a process flow of a determination program of the motor drive controller according to the embodiment.

Thereafter, the description will focus on the detail of the determination program to be executed by the incomplete lock determination unit 8 with reference to FIG. 3.

FIG. 3 is a flowchart illustrating a process flow of the determination program of the motor drive controller 1 according to the embodiment. First, the incomplete lock determination unit 8 (see FIG. 1) determines whether or not the motor 20 is in a motor activation period or a speed change period (step S1). If the motor 20 is in the motor activation period or the speed change period (Yes in step S1), the process ends without executing the determination program. As used herein, the motor activation period refers to a period of time from when the motor 20 starts until a predetermined time has elapsed; and the speed change period refers to a period of time from when a rotational speed change commanded is received by a rotational speed command signal until a predetermined time has elapsed. A difference inevitably occurs between the commanded rotational speed and the motor rotational speed during the period until the rotating body reaches a stable state, and thus it is not appropriate to perform this process to determine whether or not the rotating body is in an incomplete locked state during the period until the rotating body reaches a stable state. Therefore, during the period from the time of activation start or speed change command until a predetermined time (e.g., 30 seconds) has elapsed, the process ends without executing the determination program.

Meanwhile, if the motor 20 is not in the motor activation period or the speed change period (No in step S1), the incomplete lock determination unit 8 calculates a goal achievement rate which is the ratio of an actual rotational speed to the commanded rotational speed (step S2). Then, it is determined whether or not the goal achievement rate is equal to or less than a predetermined threshold (step S3). If the goal achievement rate is equal to or less than the predetermined threshold (Yes in step S3), the incomplete lock determination unit 8 incrementally increases the speed reduction count by 1 (step S4). Then, the incomplete lock determination unit 8 determines whether or not the speed reduction count exceeds a predetermined threshold (step S5). If the speed reduction count exceeds the predetermined threshold (Yes in step S5), the speed reduction flag is set to a set state (step S6).

Meanwhile, if the goal achievement rate is equal to or greater than the predetermined threshold (No in step S3), the incomplete lock determination unit 8 determines whether or not the speed reduction count exceeds 0 (step S7). If the speed reduction count exceeds 0 (Yes in step S7), the incomplete lock determination unit 8 decrements the speed reduction count by 1 (step S8) and sets the speed reduction flag to a clear state (step S9). The processes in steps S7 and S8 allow it to be determined that the motor 20 is in an incomplete locked state with high accuracy even if a relatively small load is applied to the rotating body to cause the motor 20 to enter an incomplete locked state.

Meanwhile, if the speed reduction count is equal to or less than the threshold (No in step S5) or if the speed reduction count does not exceed 0 (No in step S7), the incomplete lock determination unit 8 sets the speed reduction flag to the clear state in the condition as it is (step S9).

Then, the incomplete lock determination unit 8 determines whether or not the coil current value exceeds a predetermined current threshold (step S10). If the coil current value exceeds the current threshold (Yes in step S10), the overcurrent occurrence count is incrementally increased by 1 (step S11). Then, the incomplete lock determination unit 8 determines whether or not the overcurrent occurrence count exceeds a predetermined threshold (step S12). If the overcurrent occurrence count exceeds the threshold (Yes in step S12), the overcurrent flag is set to the set state (step S13). If the overcurrent occurrence count does not exceed the threshold (No in step S12), the overcurrent flag is set to the clear state (step S15).

Meanwhile, if the coil current does not exceed the current threshold (No in step S10), the incomplete lock determination 8 determines whether or not the speed reduction flag is in the set state (step S14). If the speed reduction flag is in the set state (Yes in step S14), the incomplete lock determination unit 8 sets the overcurrent flag to the clear state in the condition as it is (step S15).

If the speed reduction flag is not in the set state (No in step S14), the incomplete lock determination unit 8 determines whether or not the overcurrent occurrence count exceeds 0 (step S16). If the overcurrent occurrence count exceeds 0 (Yes in step S16), the incomplete lock determination unit 8 decrements the overcurrent occurrence count by 1 (step S17) and sets the overcurrent flag to the clear state (step S15). If the overcurrent occurrence count does not exceed 0 (No in step S16), the incomplete lock determination unit 8 sets the overcurrent flag to the clear state in the condition as it is (step S15). The processes in steps S16 and S17 allow it to be determined with a high degree of accuracy that the motor 20 is in an incomplete locked state even if a relatively small load is applied to the rotating body to cause the motor 20 to enter an incomplete locked state.

Then, the incomplete lock determination unit of 8 determines whether or not the overcurrent detection function of the motor drive controller 1 is normal (step S18). If the overcurrent detection function is normal (Yes in step S18), the incomplete lock determination unit 8 determines whether or not both the speed reduction flag and the overcurrent flag are in the set state (step S19). If both the speed reduction flag and the overcurrent flag are in the set state (Yes in step S19), the incomplete lock determination unit 8 determines that the motor 20 is in an incomplete locked state (step S20) and the process ends. If neither the speed reduction flag nor the overcurrent flag is in the set state (No in step S19), the incomplete lock determination unit 8 ends the process in the condition it is in.

Meanwhile, if the overcurrent detection function is not normal (No in step S18), the incomplete lock determination unit 8 determines whether or not either the speed reduction flag or the overcurrent flag is in the set state (step S21). If either the speed reduction flag or the overcurrent flag is in the set state (Yes in step S21), the incomplete lock determination unit 8 determines that the motor 20 is in an incomplete locked state (step S22) and the process ends. If neither the speed reduction flag nor the overcurrent flag is in the set state (No in step S21), the incomplete lock determination unit 8 ends the process in the condition it is in.

The processes in steps S18 and S21 allow it to be determined with high accuracy that the motor 20 is in an incomplete locked state even if the motor 20 is used in a severe environment and the overcurrent detection function does not operate normally. For example, if there is no current change in the coil current, it can be determined that the overcurrent detection function is not normal.

Note that the goal achievement rate threshold, the speed reduction count threshold, the overcurrent occurrence count threshold, and other thresholds for use in the determination program can be arbitrarily set and are preliminarily stored in the storage unit 9.

Note that in step S8 and step S17, the determination program decrements the speed reduction count or the overcurrent occurrence count by 1, but may decrement the count by a value other than 1. For example, in step S8 and step S17, the count may be decremented by an integer value of 2 or more.

The determination program according to the embodiment can determine that the motor 20 is in an incomplete locked state even during rotation. In addition, the determination program according to the embodiment determines the incomplete locked state in consideration of a plurality of factors (the motor rotational speed, the commanded rotational speed, and the coil current value) together, and thus can enhance the determination accuracy of the incomplete locked state.

In addition, the determination program according to the embodiment determines that the motor 20 is in a rotational speed reduction state based on the goal achievement rate, and thus can flexibly handle any specified rotational speed.

Furthermore, the determination program according to the embodiment can determine the incomplete locked state without the need to add parts or increase costs, and thus can reduce the load on the motor 20.

Note that the above embodiments have described an example of using a 3-phase brushless motor as the motor 20, but any type of motor may be used as long as the motor is controlled by a microcontroller. In addition, the above embodiments have described an example of performing the monitoring operation and the determination operation using the ratio between the motor rotational speed and the commanded rotational speed, but the monitoring operation and the determination operation may be performed using a difference between the motor rotational speed and the commanded rotational speed.

Note that the determination program according to the embodiment is just an example, and another step may be inserted instead. Note also that the method of detecting the rotational speed using the rotational position detector 4 is not particularly limited, but any detector other than the Hall sensor may be used.

It should be noted that the present disclosure is not limited to the above embodiments. The present disclosure also includes any configuration in which the above components are appropriately combined. Further effects and modifications can be easily derived by those skilled in the art. Therefore, wider aspects of the present disclosure are not limited by the above embodiments and thus various modifications can be made thereto.

What is claimed is:

1. A motor drive controller comprising:
    a monitoring unit monitoring a motor and detecting that the motor is in a driving state but is also in a predetermined abnormal state; and
    a incomplete lock determination unit executing a determination program at a point of time when the abnormal state is detected and causing the determination program to determine whether or not the motor is in an incomplete locked state in which a load not sufficient to stop the motor is applied to a rotating body rotated by driving of the motor.

2. The motor drive controller according to claim 1, wherein
the monitoring unit monitors whether or not the motor is in the abnormal state based on a commanded rotational speed instructed by a user using the motor, a motor rotational speed fed back from the motor, and a coil current value fed back from the motor.

3. The motor drive controller according to claim 2, wherein
the monitoring unit detects the abnormal state based on one or both of a difference between the commanded rotational speed and the motor rotational speed as well as a difference between a predetermined current threshold and the coil current value.

4. The motor drive controller according to claim 3, wherein the monitoring unit monitors whether or not the motor is in the abnormal state at a predetermined interval.

5. The motor drive controller according to claim 4, wherein the incomplete lock determination unit executes the determination program at a predetermined interval.

6. The motor drive controller according to claim 5, wherein the incomplete lock determination unit executes the determination program at a shorter interval than the interval at which the abnormal state is monitored.

7. The motor drive controller according to claim 3, wherein the monitoring unit detects that the motor is in the abnormal state if a frequency at which the coil current value exceeds the current threshold reaches a predetermined threshold frequency.

8. The motor drive controller according to claim 7, wherein
the incomplete lock determination unit executes the determination program; whereby
if a speed reduction count in which the ratio of the motor rotational speed to the commanded rotational speed is equal to or less than a predetermined threshold ratio is equal to or greater than a predetermined count, a speed reduction flag is set;
if an overcurrent count in which the coil current value exceeds the current threshold is equal to or greater than a predetermined threshold count, an overcurrent flag is set; and
if both the speed reduction flag and the overcurrent flag are set, the incomplete lock determination unit determines that the rotating body is in the incomplete locked state.

9. The motor drive controller according to claim 8, wherein
the incomplete lock determination unit executes the determination program; whereby
if the speed reduction flag is set and the ratio of the motor rotational speed is equal to or greater than the predetermined threshold ratio, the incomplete lock determination unit decrements the speed reduction count by 1 and clears the speed reduction flag.

10. The motor drive controller according to claim 8, wherein
the incomplete lock determination unit executes the determination program; whereby
if the overcurrent count is 1 or more and the speed reduction flag is not set, the incomplete lock determination unit decrements the overcurrent count by 1 and clears the overcurrent flag.

11. The motor drive controller according to claim 2, wherein the monitoring unit detects that the motor is in the abnormal state if a ratio of the motor rotational speed to the commanded rotational speed is equal to or less than a predetermined threshold ratio.

12. The motor drive controller according to claim 2, wherein the incomplete lock determination unit does not execute the determination program during a period from when the motor starts or the commanded rotational speed is changed until a predetermined time has elapsed.

13. The motor drive controller according to claim 1, wherein
the incomplete lock determination unit determines whether or not the motor is in the incomplete locked state based on a frequency of detecting the abnormal state; and
if the motor is determined to be in the incomplete locked state, the incomplete lock determination unit instructs a protection operation to be performed on the motor.

14. A motor drive control method of controlling a motor, the method comprising:
a step of monitoring the motor and detecting that the motor is in a driving state but in a predetermined abnormal state; and
a step of executing a determination program at a point of time when the abnormal state is detected and causing the determination program to determine whether or not the motor is in an incomplete locked state in which a load not sufficient to stop the motor is applied to a rotating body rotated by driving of the motor.

15. A motor drive controller comprising:
an integrated circuit configured to:
monitor a motor and detect whether the motor is in a driving state and in a predetermined abnormal state; and
when the motor is detected as being in the abnormal state, determining whether or not the motor is in an incomplete locked state, in which a load that is not sufficient to stop the motor is applied to a rotating body being rotated by driving of the motor.

16. The motor drive controller according to claim 15, wherein
the integrated circuit monitors whether or not the motor is in the predetermined abnormal state based on:
a commanded rotational speed instructed by a user using the motor,
a motor rotational speed fed back from the motor, and
a coil current value fed back from the motor.

17. The motor drive controller according to claim 16, wherein
the integrated circuit detects the abnormal state based on one or both of: (i) a difference between the commanded rotational speed and the motor rotational speed, and (ii) a difference between a predetermined current threshold and the coil current value.

18. The motor drive controller according to claim 17, wherein the integrated circuit detects that the motor is in the predetermined abnormal state when a frequency at which the coil current value exceeds the current threshold reaches a predetermined threshold frequency.

19. The motor drive controller according to claim 16, wherein the integrated circuit does not determine whether or not the motor is in an incomplete locked state during a period from when the motor starts or the commanded rotational speed is changed until a predetermined time has elapsed.

20. The motor drive controller according to claim 15, wherein the integrated circuit determines whether or not the motor is in the incomplete locked state based on a frequency of the abnormal state; and if the motor is determined to be in the incomplete locked state, the integrated circuit executes a protection operation on the motor.

\* \* \* \* \*